United States Patent [19]
Girardot et al.

[11] Patent Number: 5,658,041
[45] Date of Patent: Aug. 19, 1997

[54] OVERMOLDED PLASTIC-METAL MOTOR VEHICLE FRONT BODY PANEL

[75] Inventors: Ludovic Girardot; Michel Poisat, both of Langres, France

[73] Assignee: Compagnie Plastic Omnium, Lyons, France

[21] Appl. No.: 427,233

[22] Filed: Apr. 24, 1995

[30] Foreign Application Priority Data

Apr. 25, 1994 [FR] France ................................. 94 04954

[51] Int. Cl.$^6$ .................................................. B62D 25/08
[52] U.S. Cl. ......................... 296/194; 296/901; 180/68.4; 180/69.21; 264/251
[58] Field of Search ............................. 296/187, 193, 296/194, 203, 900, 901; 180/68.4, 68.6, 69.21; 264/251

[56] References Cited

U.S. PATENT DOCUMENTS 3,583,756  6/1971  Wilfert ................... 296/901 X

FOREIGN PATENT DOCUMENTS

| 2494185 | 5/1982 | France . |
| 2625164 | 6/1989 | France ................................. 296/194 |
| 7408125 | 5/1976 | Germany . |
| 3247989 | 6/1984 | Germany . |
| 3433935 | 3/1986 | Germany . |
| 2087299 | 5/1982 | United Kingdom . |

Primary Examiner—Andrew C. Pike
Attorney, Agent, or Firm—Oliff & Berridge

[57] ABSTRACT

A motor vehicle front body panel includes at least one rigid cross-member that extends between two support pieces. The rigid cross-member is preferably made of metal, and the support pieces are preferably molded of plastic. The plastic support pieces may be molded around the ends of the cross-member and may be capable of accomodating other parts of the vehicle, such as headlights. In an alternate embodiment, the vehicle front body panel may include a second rigid cross-member that is also attached to the two support pieces.

6 Claims, 4 Drawing Sheets

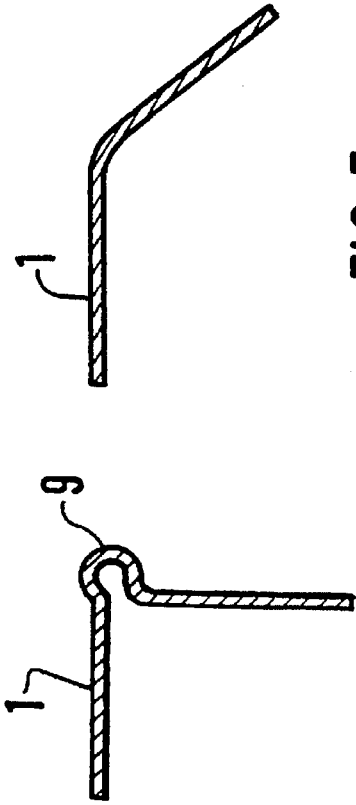
FIG.2
FIG.3
FIG.4
FIG.5
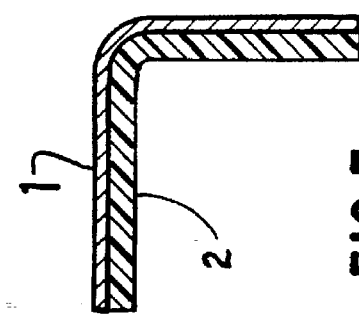
FIG.6
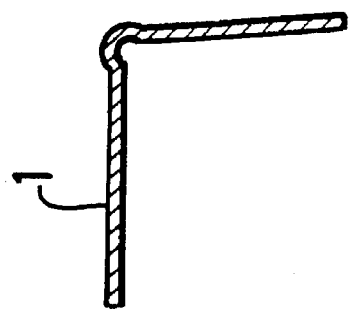
FIG.7
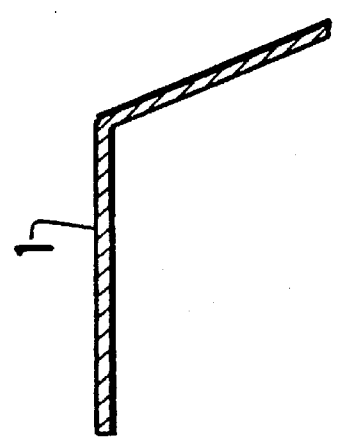
FIG.8

OVERMOLDED PLASTIC-METAL MOTOR VEHICLE FRONT BODY PANEL

BACKGROUND OF THE INVENTION

The present invention relates to a motor vehicle front body panel.

A motor vehicle front body panel is a component which is designed to be installed at the front of the vehicle, generally directly on its chassis, in order simultaneously to support the headlamp units, the hood safety fastening system, possibly the radiator grill, as well as other parts of the vehicle such as a radiator or a fan.

These functions require the front body panel to have good overall rigidity, and to be particularly strong in its region connecting the point for fastening the hood to the chassis of the vehicle.

In fact, since the function of fastening the hood constitutes an important element in the safety of the vehicle, it is of prime importance that the front body panel should exhibit optimum resistance to any force tending to lift the hood.

Now, owing to the presence of the radiator at the front of the engine of most motor vehicles, any front body panel must leave a free central passage corresponding to the dimensions of the radiator, so that the hood fastening point which is also in the central zone is situated above the opening in the front body panel.

As a result of this, the region of the front body panel connecting the point for fastening the hood to the chassis of the vehicle is not straight but follows the contour of the central passage. As a consequence, in the event of the hood being forced up it is subjected not only to tensile forces but also to substantial bending forces.

Front body panels are already known which consist of the assembly of pieces of sheet metal riveted, screwed, or welded together.

However, these sheet metal front body panels have the drawbacks of being expensive owing in particular to the number of operations required in assembling and fixing the components together, and of having substantial weight.

In order to remedy these drawbacks, front body panels using the molding of plastic have already been proposed, this making it possible to obtain components which are considerably more lightweight than sheet metal front body panels and for these to be obtained without any assembly operation.

Nevertheless, the mechanical strength of such front body panels made of plastic may prove insufficient in the event of the hood being lifted.

Furthermore, the relatively large dimensions of the front body panels may lead to internal stresses in the molded components, which moreover have low dimensional stability owing to the significant thermal expansions of plastic.

SUMMARY OF THE INVENTION

The present invention aims to provide a front body panel which does not have the drawbacks recalled hereinabove and which is furthermore particularly simple and economical to produce.

The subject of the present invention is a motor vehicle front body panel, which is characterized in that it includes at least one rigid cross-member, preferably made of metal, which extends over most of its length and at least two support pieces made of plastic securely fastened to the rigid cross-member and each able to accommodate at least one part of the vehicle such as a headlamp unit.

In a preferred embodiment of the invention, each support piece is overmolded onto an end section of the rigid cross-member.

It is understood that the front body panel according to the invention can be manufactured for a very low cost price owing to the fact that it consists of elements which are individually inexpensive and easy to join together to form the front body panel according to the invention.

Furthermore, owing to its structure, the front body panel according to the invention is particularly well suited to the hood safety fastening function.

Indeed, the rigid cross-member constitutes a part of the front body panel which is able to withstand substantial bending forces. It can therefore accommodate the hood fastening point while being secured to the chassis of the vehicle via its ends.

Another rigid cross-member may be connected to the chassis of the vehicle via end support pieces which are then subjected solely to tensile forces which they are able to withstand, or via the fenders of the vehicle in the case where the said rigid cross-member extends across the entire width of the vehicle.

The front body panel according to the invention also has the advantage of being relatively insensitive to temperature variations, the rigid cross-member having a coefficient of expansion close to that of the chassis of the vehicle, but very much less than that of a plastic, and the support pieces being sufficiently small that they expand only to a small extent.

Moreover, the dimensional stability of the end support pieces can be improved by making them from a fiber-filled plastic, the relatively high cost price of which is balanced out by the relatively small size of the support pieces. This small size moreover limits the formation of internal stresses likely to deform the said support pieces.

In a particular embodiment of the invention, the front body panel includes a first rigid cross-member at its upper part and a second rigid cross-member at its lower part, each of these rigid cross-members being connected to the plastic support pieces.

Another subject of the present invention is a method for producing a front body panel as described hereinabove.

This method is characterized in that two molds, each of which defines a support piece able to accommodate a part of the vehicle such as a headlamp unit, are located so that the said molds are situated with respect to one another in the relative position of the two support pieces of the front body panel to be produced; that at least one rigid cross-member, preferably made of metal, each end of which penetrates one of the molds, is placed between these two molds; and in that the two molds are filled with plastic in order to overmold a support piece onto each end of the rigid cross-member.

The method according to the invention is advantageous in that the spacing of the support pieces for the front body panel thus obtained is fixed by the relative positioning of the two molds, and not by the axial positioning of the rigid cross-member between these molds.

In other words, it is not obligatory for the rigid cross-member to penetrate the two molds symmetrically, it being possible for the said rigid cross-member to penetrate one of the molds more than the other mold.

As a result of this, the rigid cross-member may according to the invention, be of somewhat imprecise length, which allows wide dimensional tolerances in the manufacture of this cross-member, and be placed between the two molds with the aid of simple equipment which merely provides approximate axial positioning of the said rigid cross-member.

Advantageously, the two support pieces are overmolded at the same time so as to decrease the manufacturing time for the front body panel according to the invention.

Another subject of the present invention is a device for implementing the method described hereinabove.

This device is characterized in that it includes two molds each of which defines a support piece capable of accommodating a vehicle part such as a headlamp unit, the two molds being located so as to be situated with respect to each other in the relative position of the two support pieces of the front body panel to be produced, each mold being capable of accommodating the end of a rigid cross-member extending between the two molds.

BRIEF DESCRIPTION OF THE DRAWINGS

For the purpose of making the invention easier to understand, one embodiment thereof, given by way of non-limiting example, will now be described with reference to the appended drawings in which:

FIG. 2 is a cross-sectional view of a rigid cross-member that can be used to produce a front body panel according to the invention, taken along section line II—II;

FIG. 3 is a cross-sectional view, similar to FIG. 2, rigid cross-member;

FIG. 4 is a cross-sectional view, similar to FIG. 2, of another rigid cross-member;

FIG. 5 is a cross-sectional view, similar to FIG. 2, of another rigid cross-member;

FIG. 6 is a cross-sectional view, similar to FIG. 2, of another rigid cross-member;

FIG. 7 is a cross-sectional view of a support member overmolded onto a rigid cross-member taken along section line VII—VII;

FIG. 8 is a cross-sectional view of a fastener for a hood of a vehicle overmolded onto a rigid cross-member taken along section line VIII—VIII;

DETAILED DESCRIPTION OF PREFERRED EMBODIMENTS

Figure 1:
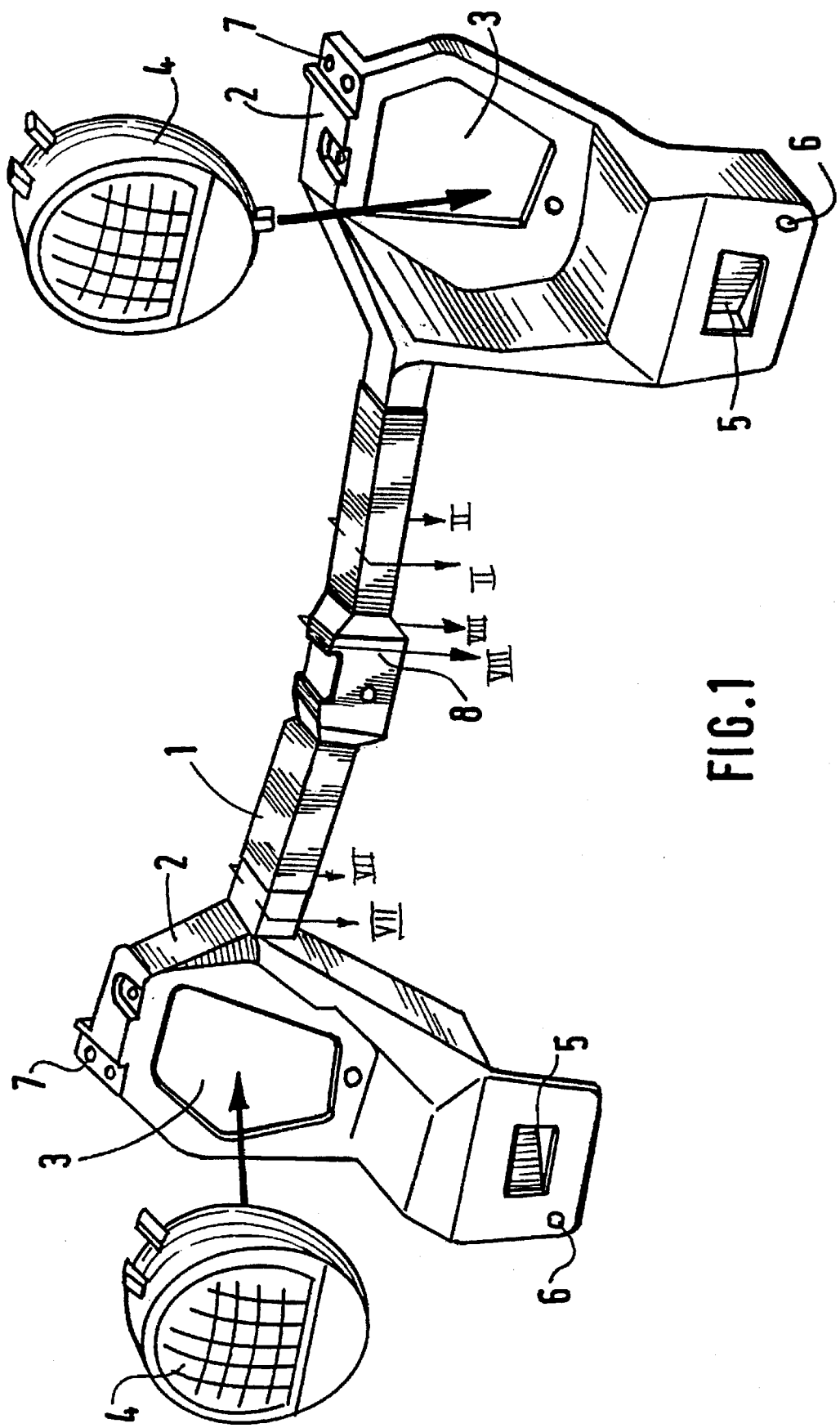
FIG. 1 is a view in perspective of a front body panel according to one embodiment of the invention, with two headlamp units.

The front body panel illustrated in FIG. 1 includes a rigid cross-member 1 made of aluminum which has an L-shaped section, examples of which are represented in FIGS. 2 to 6.

The rigid cross-member 1 is overmolded at each of its ends with support pieces 2 made of plastic, as shown in FIG. 7, which include a housing 3 for accommodating a headlamp unit 4.

Each support piece 2 further includes an additional housing 5 for accommodating, for example, an indicator.

The front body panel illustrated is intended to be securely attached to the chassis of the vehicle by fastening points 6 which are at the lower part of each support piece 2.

Fastening lugs 7 are also provided at the upper part of each support piece 2 in order to secure these to the fenders of the vehicle.

The rigid cross-member 1 in its central part includes a fastener 8 made of overmolded plastic, as shown in FIG. 8, which is intended to accommodate the safety hook of the hood, not represented.

In the cross-sectional views shown in FIGS. 2 to 6, FIGS. 2, 3, and 4 correspond to extruded rigid cross-members.

It may be observed that the rigid cross-member of FIG. 4 has an outwardly pointing bead 9 on its edge, which makes it possible to anchor the safety hook of the hood directly onto the rigid cross-member without it being necessary to overmold a plastic fastener 8 like the one illustrated in FIG. 1.

The sections of FIGS. 5–8 correspond to pressed rigid cross-members.

The structure of the front body panel according to the invention lends itself particularly well to the hood safety fastening function.

In fact, in the case of the hood being forced up, the hood safety hook exerts an upwardly directed force on the rigid cross-member 1, which force is transmitted via the rigid cross-member to the plastic support pieces 2. The rigid cross-member 1 is then subjected to a bending force while the support pieces 2 are acted upon merely in tension in their straight part lying between the end of the rigid cross-member 1 and the point 6 at which they are fastened to the chassis of the vehicle.

This results in the front body panel according to the invention exhibiting strong resistance to the hood being forced up.

By way of example of plastics which can be used to produce the support pieces 2, mention may be made of polyamide, possibly filled with reinforcing fibers whose function is to limit the thermal expansion of the molded component and to increase its temperature resistance, styrene maleic anhydride (SMA) also filled with fibers, or alternatively polybutyl terephthalate (PBT).

In accordance with the invention, it is not necessary for the middle of the rigid cross-member 1 to be situated exactly in the mid-plane of the front body panel.

In other words, the rigid cross-member 1 may penetrate one of the support pieces 2 more than the other support piece 2.

This difference, which must nevertheless be sufficiently small not to affect the overall rigidity of the front body panel according to the invention, is compensated for by the length of the region where each support piece is overmolded onto the rigid cross-member.

Under these conditions, the rigid cross-member can be positioned with relatively low accuracy when overmolding the two support pieces 2.

Figure 9:
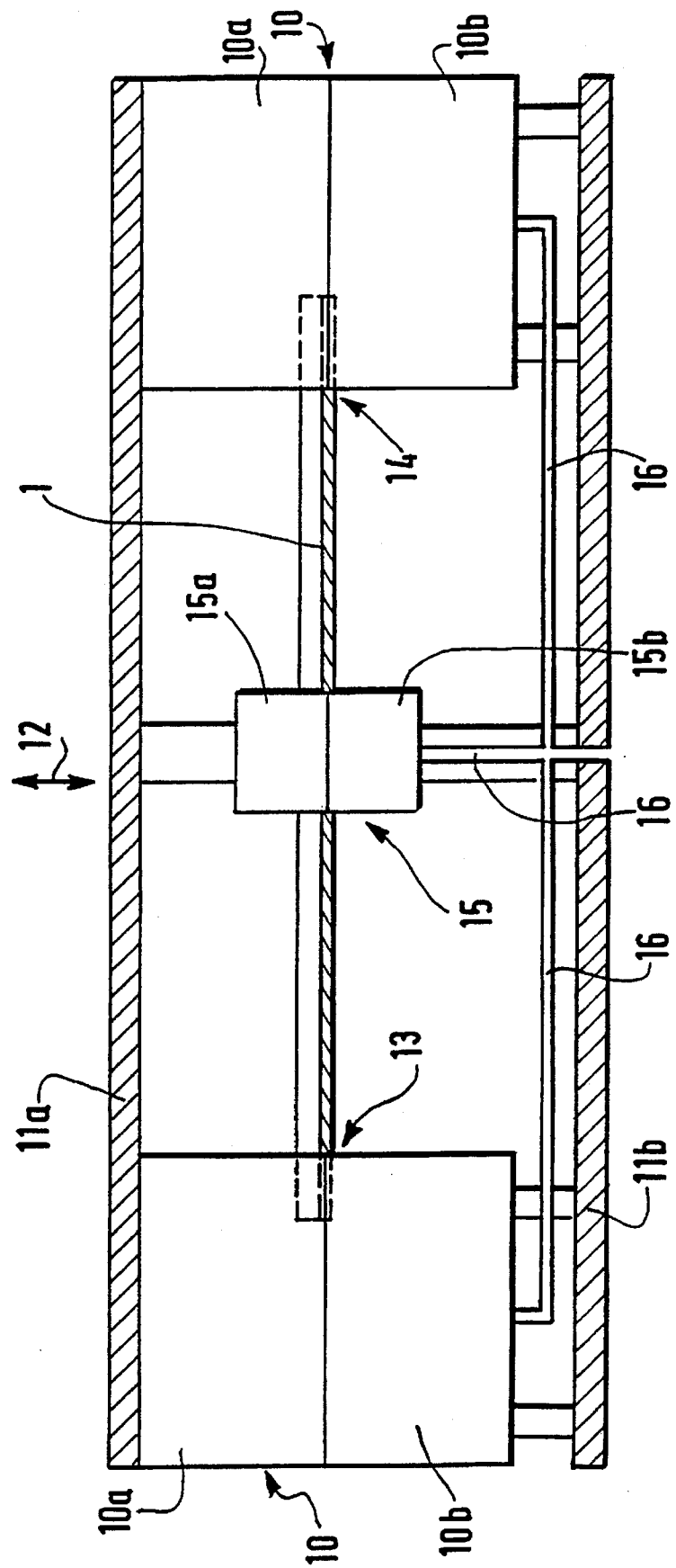
FIG. 9 is an elevational view of a device making it possible to produce the front body panel of FIG. 1.

FIG. 9 represents a device making it possible to produce the front body panel of FIG. 1.

This device includes two end molds 10, the internal cavities of which are symmetrical.

Each internal cavity of a mold 10 defines a support piece 2.

The molds 10 each consist of two half molds 10a, 10b which are each secured to platens 11a, 11b.

The platen 11a is capable of moving in the direction indicated by the double-headed arrow 12 in order to open or close the molds 10.

In accordance with the invention, the separation of the two molds 10 is such that their internal cavities are very precisely situated in the relative position of the two support pieces 2 of the front body panel to be produced.

Under these conditions, the rigid cross-member 1 can be positioned between the two molds 10 with its ends 13 and 14 penetrating the molds 10 over unequal lengths.

In contrast, it is obvious that the transverse positioning of the rigid cross-member 1 must be achieved accurately.

The device illustrated further includes a central mold 15 which is intended to overmold the fastener 8 accommodating the hood safety hook.

This central mold 15 also consists of a half mold 15a secured to the moving platen 11a and a half mold 15b secured to the stationary platen 11b.

Runners 16 make it possible to inject plastic into the three molds 10 and 15 in order simultaneously to overmold the two support pieces 2 and the hood safety fastener 8, in order to obtain a particularly short manufacturing cycle for the front body panel.

Alternatively, an individual runner could be provided for the central mold 15, so as to make the hood safety fastener 8 from a different material than the two support pieces 2. This alternative would nevertheless allow the support pieces and the fastener to be overmolded simultaneously.

In another embodiment which has not been represented, the plastic support pieces may be molded separately then attached to the rigid cross-member to which they are secured mechanically.

The mechanical securing means which can be used for this purpose may be of any known type.

In another embodiment which has not been illustrated, the rigid cross-member extends as far as the fenders, that is to say over the entire width of the vehicle.

This embodiment has the advantage of allowing the rigid cross-member to be fastened directly to the fenders.

However, assuming that the rigid cross-member is made of a relatively expensive material, it may be preferable, as in the embodiment illustrated in the drawing, to limit the length of the said rigid cross-member in order to reduce the cost price of the front body panel according to the invention.

Figure 10:
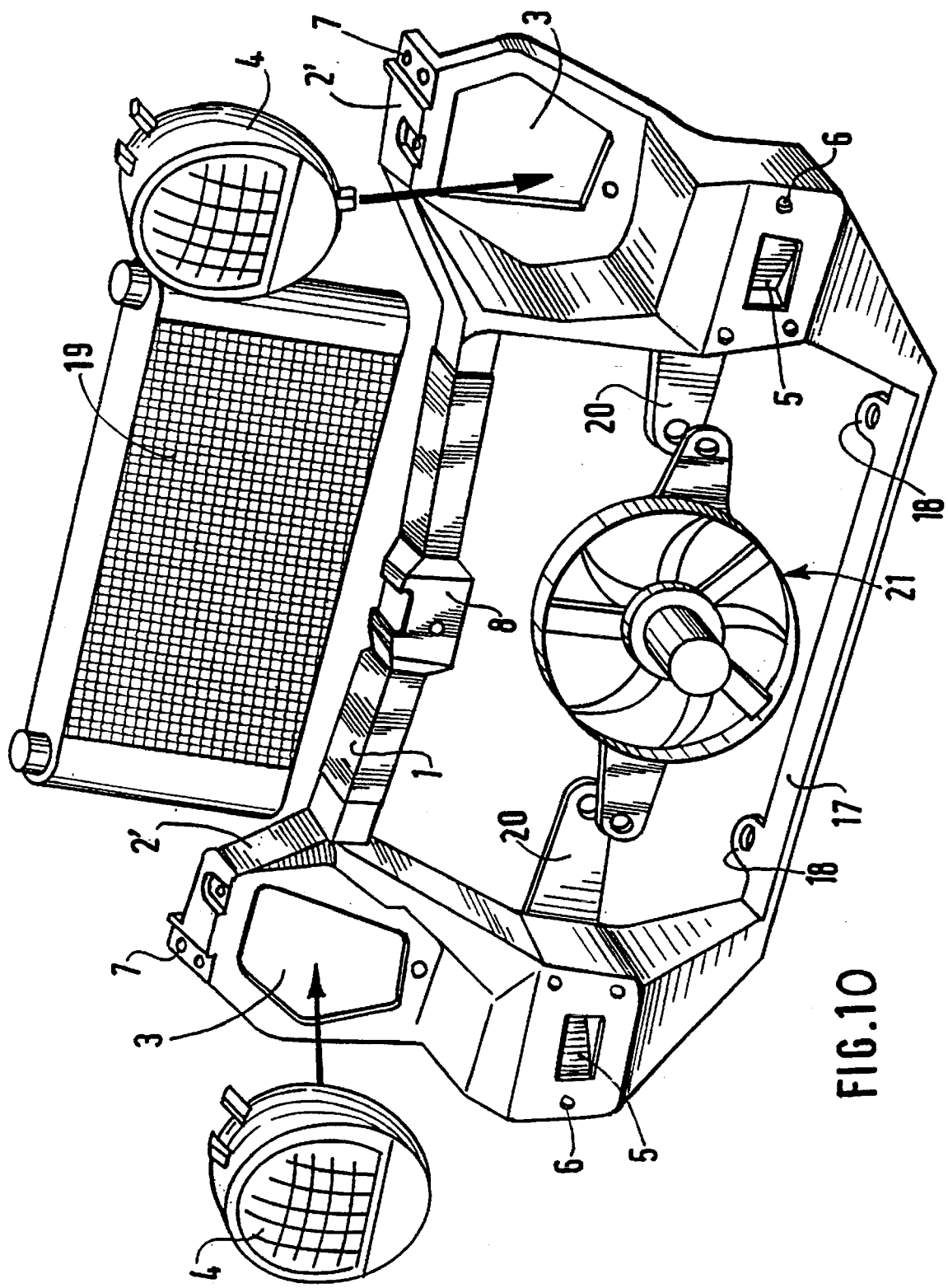
FIG. 10 is a view similar to FIG. 1 of a front body panel according to another embodiment of the invention.

FIG. 10 represents another embodiment of the invention in which the support pieces 2' for the front body panel extend at the lower part where they are securely attached to a second rigid cross-member 17.

The benefit in such an embodiment lies in the fact that the front body panel has improved overall rigidity.

Fastening lugs 18 are provided on the rigid cros-smember 17 for accommodating the lower part of a radiator 19, the upper part of which is intended to be fastened to the upper rigid cross-member 1.

The support pieces 2' further include lugs 20 designed to support a fan 21 situated in front of the radiator 19.

In accordance with the invention, the relative positioning of the two support pieces 2' is preferably provided by simultaneous overmolding of the support pieces 2' onto the rigid cross-members 1 and 17.

In another embodiment which has not been represented, one of the support pieces includes a lock designed to act as a point for fastening the hood while the other support piece includes the hood safety hook. The lock and the safety hook may advantageously be overmolded into each support piece.

It is quite obvious that the embodiments which have just been described have no limiting nature and that they can benefit from any desirable modifications without thereby departing from the scope of the invention.

We claim:

1. A motor vehicle front body panel, comprising:

at least two separate support members formed of a plastic material, the support members having a shape that accommodates at least one part of a motor vehicle; and a rigid cross-member that extends between the at least two support members, wherein respective ones of the at least two support members are overmolded onto opposite ends of the cross-member.

2. The motor vehicle front body panel according to claim 1, wherein a central portion of the cross-member has a fastener for accommodating a safety hook of a hood of the motor vehicle.

3. The motor vehicle front body panel according to claim 2, wherein the fastener is formed of plastic overmolded onto the cross-member.

4. The motor vehicle front body panel according to claim 2, wherein the fastener comprises a bead on the cross-member.

5. The motor vehicle front body panel according to claim 1, further comprising a second rigid cross-member, wherein opposite ends of the second rigid cross member are attached to respective ones of the at least two support members.

6. The motor vehicle front body panel according to claim 5, wherein respective ones of the at least two support members are overmolded onto opposite ends of the second rigid cross-member.

* * * * *

UNITED STATES PATENT AND TRADEMARK OFFICE
CERTIFICATE OF CORRECTION

PATENT NO. : 5,658,041
DATED : August 19, 1997
INVENTOR(S) : Ludovic GIRARDOT and Michel POISAT It is certified that error appears in the above-indentified patent and that said Letters Patent is hereby corrected as shown below:

On the front cover, in item [73], change "Lyons" to --Lyon--.

Signed and Sealed this

Twenty-first Day of October 1997

Attest:

BRUCE LEHMAN

Attesting Officer

Commissioner of Patents and Trademarks